United States Patent
Kraemer et al.

(10) Patent No.: US 8,616,002 B2
(45) Date of Patent: Dec. 31, 2013

(54) GAS TURBINE PREMIXING SYSTEMS

(75) Inventors: Gilbert Otto Kraemer, Greer, SC (US); Balachandar Varatharajan, Loveland, OH (US); Andrei Tristan Evulet, Clifton Park, NY (US); Ertan Yilmaz, Glenville, NY (US); Benjamin Paul Lacy, Greer, SC (US)

(73) Assignee: General Electric Company, Schenectady, NY (US)

( * ) Notice: Subject to any disclaimer, the term of this patent is extended or adjusted under 35 U.S.C. 154(b) by 1005 days.

(21) Appl. No.: 12/508,545

(22) Filed: Jul. 23, 2009

(65) Prior Publication Data

US 2011/0016871 A1    Jan. 27, 2011

(51) Int. Cl.
*F02C 7/22* (2006.01)

(52) U.S. Cl.
USPC .......... 60/737; 60/734; 60/733; 60/39.463; 60/746; 60/738

(58) Field of Classification Search
USPC .......... 60/39.463, 737, 746, 747, 772, 738, 60/734, 773, 733
See application file for complete search history.

(56) References Cited

U.S. PATENT DOCUMENTS

| | | | | |
|---|---|---|---|---|
| 4,100,733 A | * | 7/1978 | Striebel et al. | 60/39.463 |
| 5,203,796 A | | 4/1993 | Washam et al. | |
| 5,823,761 A | | 10/1998 | Euzen et al. | |
| 5,943,866 A | * | 8/1999 | Lovett et al. | 60/737 |
| 6,070,410 A | * | 6/2000 | Dean | 60/737 |
| 6,558,154 B2 | | 5/2003 | Eroglu et al. | |
| 6,598,383 B1 | * | 7/2003 | Vandervort et al. | 60/773 |
| 6,779,333 B2 | * | 8/2004 | Gerhold | 60/39.53 |
| 6,877,307 B2 | * | 4/2005 | Ryan et al. | 60/39.281 |
| 6,915,776 B2 | | 7/2005 | zur Loye et al. | |
| 6,955,040 B1 | | 10/2005 | Myers, Jr. et al. | |
| 6,968,699 B2 | | 11/2005 | Howell et al. | |
| 7,036,302 B2 | | 5/2006 | Myers, Jr. et al. | |
| 7,189,073 B2 | | 3/2007 | Pennell et al. | |
| 7,380,402 B2 | * | 6/2008 | Rebhan et al. | 60/776 |
| 7,469,544 B2 | * | 12/2008 | Farhangi | 60/740 |
| 7,886,991 B2 | | 2/2011 | Zuo et al. | |
| 8,147,121 B2 | | 4/2012 | Lacy et al. | |
| 8,240,150 B2 | | 8/2012 | Varatharajan et al. | |
| 8,256,226 B2 | | 9/2012 | Khan et al. | |
| 8,327,642 B2 | | 12/2012 | Uhm et al. | |
| 8,413,445 B2 | | 4/2013 | Poyyapakkam | |
| 8,424,311 B2 | | 4/2013 | York et al. | |
| 2002/0142257 A1 | | 10/2002 | Eroglu et al. | |
| 2004/0050057 A1 | * | 3/2004 | Bland et al. | 60/737 |
| 2004/0053181 A1 | | 3/2004 | Pennell et al. | |

(Continued)

FOREIGN PATENT DOCUMENTS

CA    2459187    2/2004
EP    0319246 A2    6/1989

(Continued)

*Primary Examiner* — William H Rodriguez
*Assistant Examiner* — Steven Sutherland
(74) *Attorney, Agent, or Firm* — Fletcher Yoder, P.C.

(57) ABSTRACT

Methods and systems are provided for premixing combustion fuel and air within gas turbines. In one embodiment, a combustor includes an upstream mixing panel configured to direct compressed air and combustion fuel through a premixing zone to form a fuel-air mixture. The combustor also includes a downstream mixing panel configured to mix additional combustion fuel with the fuel-air mixture to form a combustion mixture.

22 Claims, 6 Drawing Sheets

(56) References Cited

U.S. PATENT DOCUMENTS

| | | |
|---|---|---|
| 2004/0221582 A1 | 11/2004 | Howell et al. |
| 2005/0106522 A1 | 5/2005 | Eroglu et al. |
| 2005/0175948 A1 | 8/2005 | Pennell et al. |
| 2005/0198964 A1 | 9/2005 | Myers, Jr. et al. |
| 2005/0217269 A1 | 10/2005 | Myers, Jr. et al. |
| 2007/0119147 A1* | 5/2007 | Cornwell et al. .......... 60/39.281 |
| 2010/0186413 A1 | 7/2010 | Lacy et al. |
| 2010/0192581 A1 | 8/2010 | Ziminsky et al. |
| 2010/0218501 A1 | 9/2010 | York et al. |
| 2010/0293956 A1 | 11/2010 | Nadkarni et al. |
| 2011/0016866 A1 | 1/2011 | Boardman et al. |

FOREIGN PATENT DOCUMENTS

| | | |
|---|---|---|
| EP | 0784188 | 7/1997 |
| EP | 1067337 | 1/2001 |
| EP | 1205653 | 5/2002 |
| EP | 1475569 | 11/2004 |
| EP | 1990581 A2 | 11/2008 |

* cited by examiner

GAS TURBINE PREMIXING SYSTEMS

This invention was made with Government support under contract number DE-FC26-05NT42643 awarded by the U.S. Department of Energy (DOE). The Government has certain rights in the invention.

BACKGROUND OF THE INVENTION

The subject matter disclosed herein relates to premixing systems for gas turbines and more specifically, to premixing systems employing a pair of fuel and air mixing panels separated by a fuel and air mixing region.

In general, gas turbines combust a mixture of compressed air and fuel to produce hot combustion gases. Gas turbine engine efficiency may increase as the combustion gas temperature increase. However, at high temperatures compounds such as nitric oxide and nitrogen dioxide (collectively known as NOx) may be formed that are subject to governmental regulations. Moreover, the rate of chemical reactions forming NOx generally may be an exponential function of temperature. Accordingly, it may be desirable to control temperatures to inhibit NOx formation while allowing high enough temperatures to operate gas turbine engines in an efficient range. However, even at controlled temperatures, hot spots may occur as a result of uneven mixing of the compressed air and fuel, which in turn may promote formation of NOx.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a combustor and a premixing system disposed within the combustor. The premixing system includes an upstream mixing panel with first fuel passages and first air passages for directing fuel and air through the first mixing panel, a downstream mixing panel with second fuel passages and second air passages for directing the fuel and the air through the second mixing panel to a combustion chamber, and a premixing zone formed between the upstream mixing panel and the downstream mixing panel and configured to direct the fuel and the air from the upstream mixing panel into the downstream mixing panel.

In a second embodiment, a system includes a combustor liner, an upstream mixing panel mounted in the combustor liner and configured to direct compressed air and combustion fuel through a premixing zone to form a fuel-air mixture, a downstream mixing panel mounted in the combustor liner and configured to mix additional combustion fuel with the fuel-air mixture to form a combustion mixture, and a combustion chamber configured to combust the combustion mixture.

In a third embodiment, a method includes directing a first flow of a combustion fuel through an upstream mixing panel to form a fuel-air mixture, directing the fuel-air mixture through a premixing zone to a downstream mixing panel, directing a second flow of a combustion fuel through the downstream mixing panel to mix the second flow with the fuel-air mixture, and adjusting the first flow, the second flow, or both in response to detecting flame holding and/or increased NOx emissions.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to gas turbine engines that include premixing systems designed to premix a portion of the fuel prior to the combustion zone. Specifically, the premixing systems include two premixing panels, an upstream premixing panel and a downstream premixing panel, separated by a premixing zone. The upstream premixing panel may include a Premixed Direct Injection (PDI) panel or a Lean Direct Injection (LDI) panel. The downstream premixing panel also may include a Premixed Direct Injection (PDI) panel or a Lean Direct Injection (LDI) panel, as well as other types of fuel and air mixing systems, such as swirler based premixers. In general, the upstream panel may receive approximately 0.25-0.50 percent of the fuel entering the combustion chamber. The fuel injected through the upstream panel may be mixed with air and may further mix with the air as it flows through the premixing zone to form a fuel-air mixture. The fuel-air mixture may then flow through the downstream panel, which receives the remaining percentage of the fuel entering the combustion chamber. Within the downstream panel, the remaining percentage of the fuel may be mixed with the fuel-air mixture from the premixing zone to form a combustion mixture of fuel and air.

Rather than employing a single PDI combustor or LDI combustor, the premixing systems employ pairs of premixing panels separated by a premixing zone. The separation of the two premixing panels by the premixing zone allows the upstream panel to be located away combustion flame thereby reducing the likelihood of auto ignition, flashback, and/or flame holding. Further, because the upstream panel may premix a portion of the fuel, the downstream premixing panel generally may receive less fuel when compared to single LDI or PDI panel systems, which may reduce the combustion temperatures as well as reduce the likelihood of auto ignition, flashback, and/or flame holding. In certain embodiments, the upstream air passages may be larger than the downstream panels to minimize overall system pressure loss.

The upstream panel, the downstream panel, and the premixing zone, may facilitate a more uniform mixture of fuel and air in the combustion mixture, which in turn may reduce hot spots in the combustion chamber that could lead to increased NOx formation. In general, the premixing systems may facilitate combustion of highly reactive fuels (i.e. fuels with a high hydrogen content) while producing approximately less than 25 ppm of NOx. More specifically, the premixing systems may facilitate combustion of highly reactive fuels while producing approximately less than 10 ppm of NOx, or even more specifically, approximately less than 3 ppm of NOx.

Figure 1:
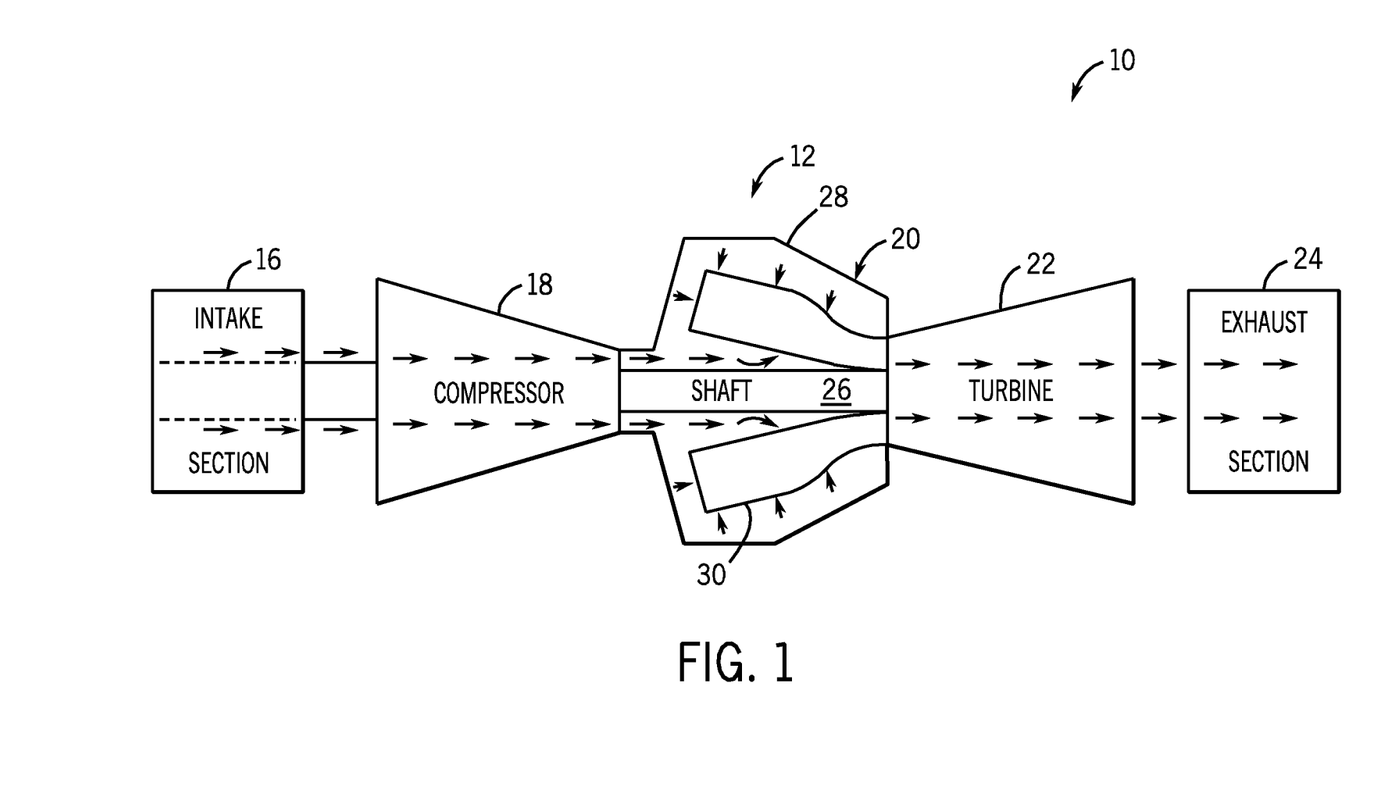
FIG. 1 is a schematic flow diagram of an embodiment of a gas turbine engine that may employ premixing systems.

FIG. 1 is a block diagram of an exemplary system 10 including a gas turbine engine 12 that may employ premixing systems. In certain embodiments, the system 10 may include an aircraft, a watercraft, a locomotive, a power generation system, or combinations thereof. The illustrated gas turbine engine 12 includes an air intake section 16, a compressor 18, a combustor section 20, a turbine 22, and an exhaust section 24. The turbine 22 is coupled to the compressor 18 via a shaft 26.

As indicated by the arrows, air may enter the gas turbine engine 12 through the intake section 16 and flow into the compressor 18, which compresses the air prior to entry into the combustor section 20. The illustrated combustor section 20 includes a combustor housing 28 disposed concentrically or annularly about the shaft 26 between the compressor 18 and the turbine 22. The compressed air from the compressor 18 enters combustors 30 where the compressed air may mix and combust with fuel within the combustors 30 to drive the turbine 22. The premixing systems may be employed within the combustors 30 to premix the air and fuel prior to entry into the combustion zone of the combustors 30.

From the combustor section 20, the hot combustion gases flow through the turbine 22, driving the compressor 18 via the shaft 26. For example, the combustion gases may apply motive forces to turbine rotor blades within the turbine 22 to rotate the shaft 26. After flowing through the turbine 22, the hot combustion gases may exit the gas turbine engine 12 through the exhaust section 24.

Figure 2:
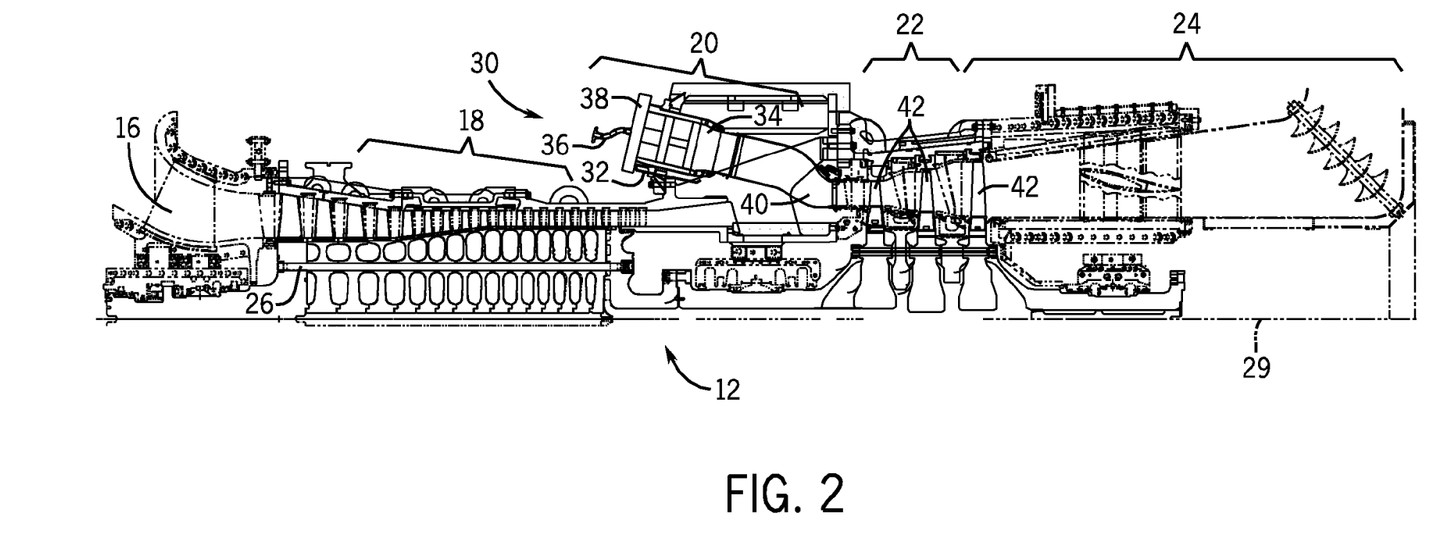
FIG. 2 is a sectional view of an embodiment of the gas turbine engine of FIG. 1 sectioned through the longitudinal axis.

FIG. 2 is a cross-sectional side view of an embodiment of the gas turbine engine 12 of FIG. 1 taken along a longitudinal axis 29. The gas turbine engine 12 includes one or more premixing systems 32 located inside the combustor section 20. In certain embodiments, the gas turbine engine 12 may include multiple can-annular combustors 30. In these embodiments, each or some of the multiple combustors 30 may include premixing systems 32. According to certain embodiments, the combustors 30 may be diffusion flame or pre-mix flame can combustors. Further, in certain embodiments, the combustors 30 may be diffusion flame combustors with a wide turndown ratio and low dynamics, enabling combustion of a wide range of fuels. Moreover, in certain embodiments, the combustors 30 may be Dry-low NOx (DLN) combustors including lean premixed combustors and/or lean direct injection combustors.

The premixing system 32 extends across a portion of the combustor 30 and leads to a combustion chamber 34 disposed downstream of the premixing system 32. Fuel may enter the combustor 30 through a fuel inlet 36 attached to an end cover 38 of the combustor 30. As discussed below with respect to FIG. 3, a portion of the fuel may enter the premixing system 32 where the fuel is mixed with air from the compressor 18 to form a combustion mixture of fuel and air. The combustion mixture may then enter the combustion chamber 34 where the combustion mixture may be ignited to form combustion gases.

In general, the premixing system 32 may allow a portion of the fuel to be mixed with air prior to entering the combustion chamber 34, which may result in decreased temperatures and, consequently, decreased NOx formation during combustion. The combustion gases may exit the combustor section 20 and flow through a transition section 40 to the turbine 22. Within the turbine 22, the combustion gases may turn blades 42 that extend radially within the turbine 22 to rotate the shaft 26 before exiting through the exhaust section 24.

Figure 3:
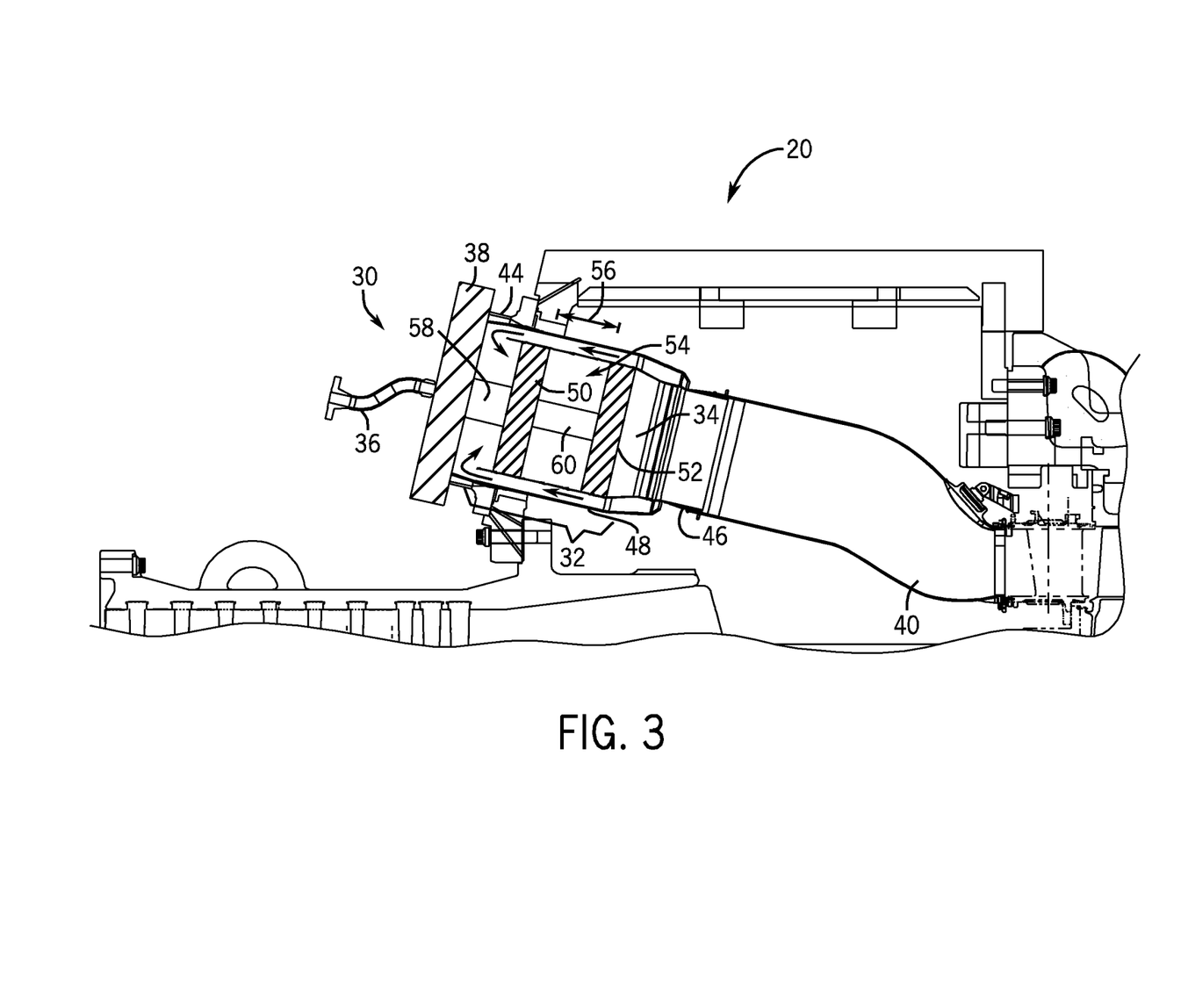
FIG. 3 is a detail view of a portion of the gas turbine engine of FIG. 2 depicting a combustor having a premixing system.

A detailed view of an embodiment of the combustor section 20 is illustrated in FIG. 3. The combustor 30 includes the combustion chamber 34, which is generally defined by a casing 44, a liner 46, and a flow sleeve 48. The flow sleeve 48 may be located coaxially and/or annularly about the liner 46 to direct air from the compressor into the premixing system 32, as generally shown by the arrows.

The premixing system 32 extends within a portion of the liner 46 and includes an upstream panel 50 and a downstream panel 52 separated by a premixing zone or section 54. The panels 50 and 52 may be mounted within the liner 46, for example, by hula seals or other suitable attachment mechanisms, to separate the premixing section 54 from other portions of the combustor 30. The premixing section 54 may extend for a length 56 within the liner 46. The panels 50 and 52 may be designed to promote mixing within a short distance, and according to certain embodiments, the length 56 may be approximately 5-13 cm (2-5 inches), and all sub-ranges therebetween. More specifically, the length 56 may be approximately 8-10 cm (3-4 inches). However, in other embodiments, the length 56 may vary.

Fuel may enter the combustor 30 through the fuel inlet 36. Any suitable combustion fuel may be employed. However, according to certain embodiments, the fuel may include synthetic gas (syngas) or other highly reactive fuels (i.e. fuels with low methane and inert content), such as hydrogen, acetylene, ethylene, carbon monoxide, or combinations thereof. The fuel may flow through one or more passages within the end cover 38 to an upstream fuel passage 58. The upstream fuel passage 58 may direct a portion of the fuel through the upstream panel 50. According to certain embodiments, approximately 15-85 percent of the fuel entering the combustor 30 may be directed through the upstream panel 50. More specifically, approximately 25-75 percent of the fuel entering the combustor 30 may be directed through the upstream panel 50. Within the panel 50, or upon exiting the panel 50, the fuel may mix with the compressed air and flow through the premixing section 54 to form a fuel-air mixture. As the fuel and air flows along the length 56 of the premixing section 54, the fuel and air may further mix, which may promote a more uniform mixture of fuel and air. The fuel-air mixture may then exit the premixing section 54 through the downstream panel 52 where the fuel-air mixture may be injected into the combustion section 34.

The remaining portion of the fuel (i.e., the fuel not flowing through the upstream panel 50) may be directed through the downstream fuel passage 60 to the downstream panel 52. In certain embodiments, the downstream fuel passage 60 may be disposed concentrically within the upstream fuel passage 58. However, in other embodiments, the fuel passages 58 and 60 may be separate from one another and/or disposed in different locations within the combustor 30. For example, in certain embodiments, the downstream fuel passage 60 may extend into the premixing section 54 through the liner 46. The remaining portion of the fuel may be contained within the fuel passage 60 as the fuel flows through the premixing section 54, thereby preventing mixing of the remaining portion of the fuel with the air until the fuel flows through the downstream panel 52. Further, in certain embodiments, the downstream fuel passage 60 may bypass the premixing section 54 and extend directly through the liner 46 to the downstream panel 52. As the remaining portion of the fuel flows through the downstream panel 52 and/or exits the downstream panel 52, this additional fuel may be mixed with fuel-air mixture from the premixing section 54 to form a combustion mixture of fuel and air. The combustion mixture may then be combusted within the combustion chamber 34.

Figure 4:
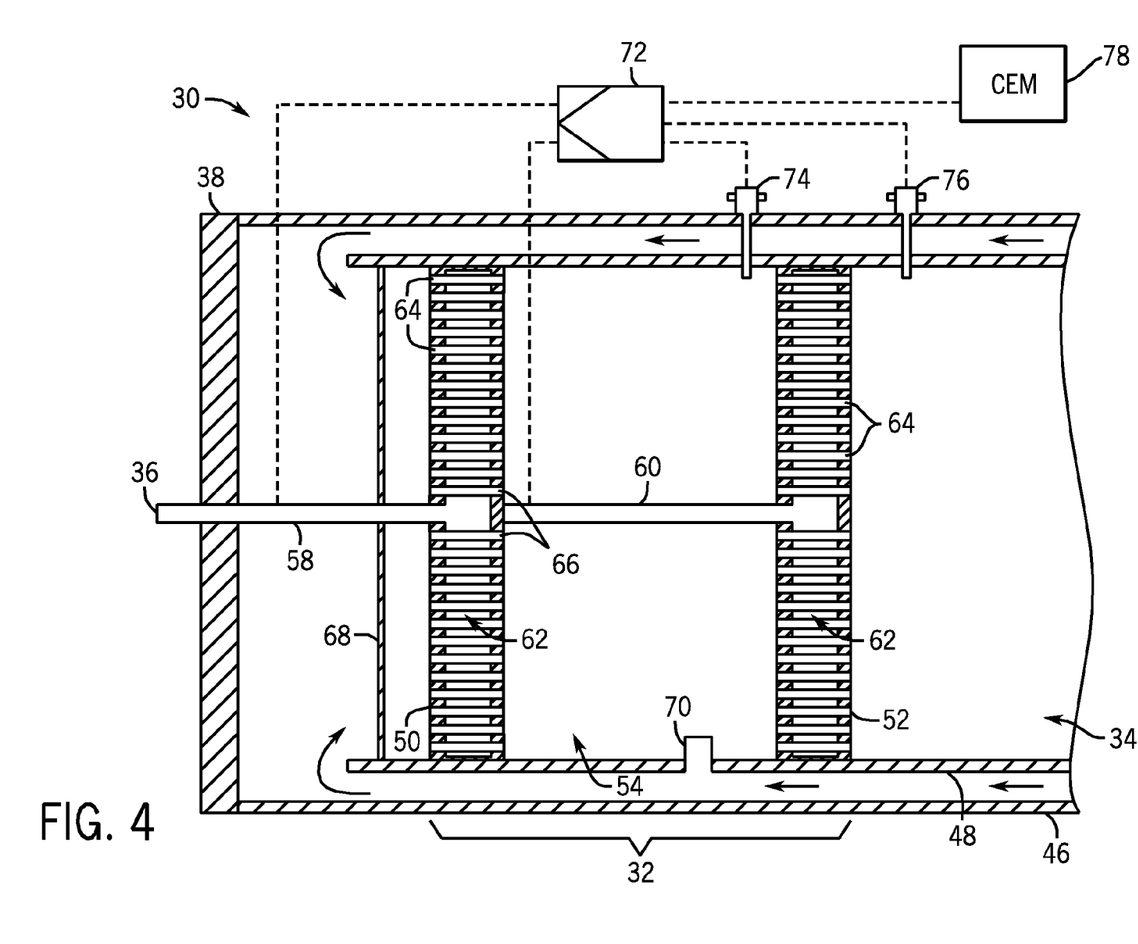
FIG. 4 is a detail view of an embodiment of the premixing system shown in FIG. 3.

FIG. 4 is a cross-sectional view of an embodiment of the combustor 30. Each panel 50 and 52 may include one or more fuel passages, such as fuel plenums 62 and one or more air passages, such as air tubes 64. The fuel may enter the fuel plenums from the fuel passages 58 and 60 and may be distributed within the plenums 62 around the tubes 64. However, in other embodiments, the fuel passages and/or the air passages may include any suitable type of flow paths, such as tubes, plenums, or combinations thereof.

The panels 50 and 52 may include PDI panels, LDI panels, or combinations thereof. Specifically, in a PDI panel, mixing of the fuel and air may occur within the panel 50 or 52. For example, as shown in FIG. 4, the air tubes 64 may include openings allowing the fuel to enter the air tubes 64 from the plenum 62. The fuel and air may mix within the air tubes 64 prior to exiting the panel 50 or 52. In an LDI panel, mixing of the fuel and air may occur as the fuel and air exits the panel 50 or 52. For example, as will be described below with respect to FIG. 7, the fuel may exit the panel 50 or 52 through separate passages adjacent to and/or directed toward the exit of the air tubes 64. Regardless of the type of panel, the panels 50 and 52 may be designed to withstand the high temperatures reigning within the premixing system 54. For example, the panels 50 and 52 may be designed to withstand temperatures exceeding approximately 1090° C. (2000° F.). Further, in certain embodiments, the downstream panel 52 may include any suitable type or premixing panel, including PDI panels and LDI panels, conventional swirl based premixers, among others. The upstream panel may have a different design from the downstream panel to optimize system parameters such as pressure loss. The panels may be continuous units or discrete sections brought together directly or joined for example in a cap assembly in which are mounted the PDI, LDI, or other fuel and other air premixer designs.

Regardless of the panel type, the panels 50 and 52 generally produce a flammable mixture of fuel and air, which may facilitate flashback, flame holding, and/or auto ignition. However, the inclusion of two panels 50 and 52 within the premixing system 32 allows a portion of the fuel and air to be premixed in an area separated from the flame within the combustion chamber 34. Specifically, the upstream panel 50 allows a portion of the fuel and air to be mixed in the premixing zone 54 that is separated from the combustion zone 34 by the downstream panel 52. Moreover, the premixing zone 54 allows additional space for mixing of the fuel and air, which may provide a more uniform mixture within the combustion chamber 34, thereby lowering combustion temperatures (i.e. the adiabatic flame temperature). To further reduce the risk of flame holding occurring near the upstream panel 50, the air tubes 66 adjacent to the downstream fuel passage 60 may not have holes for receiving fuel (i.e. in a PDI panel) or may not have separate fuel passages directed towards them (i.e. in an LDI panel). Consequently, the adjacent air tubes 66 may create an air curtain, relatively free of fuel, around the upstream fuel passage 60, which may cool or extinguish a flame if it travels up the upstream fuel passage 60.

The inclusion of two panels 50 and 52 within the premixing system 32 further may be designed to produce a more uniform mixture of fuel and air within the combustion zone 34. Specifically, because a portion of the fuel entering the downstream panel 52 is premixed with air prior to entering the downstream panel 52, a lower portion of unmixed fuel may be added to the downstream panel 52. Consequently, a more thorough mixing of fuel and air within and/or exiting the downstream panel 52 may be achieved. The more uniform mixing may generally be designed to prevent hot spots within the combustion zone 34 that could lead to increased NOx levels and reduce gas turbine component life.

As discussed above with respect to FIG. 3, fuel may enter the combustor 30 through the fuel inlet 36 and air may enter the combustor 30 through the annular space between the flow sleeve 48 and the liner 46, as indicated generally by the arrows. An optional flow conditioner 68 may be disposed upstream from the upstream panel 50. The flow conditioner 68 may include a perforated plate, or other suitable structure, designed to inhibit the flow of particulates into the premixing system 32. However, in other embodiments, the flow conditioner 68 may be omitted. According to certain embodiments, all of the air may enter the premixing system 32 through the upstream panel 50. However, in other embodiments, a portion of the air may be allowed to enter the premixing system 32 through one or more air bypass sections 70 connecting the annular passage between the flow sleeve 48 and the liner 46 to the premixing zone 54. For example, in certain embodiments, it may be desirable to maintain sufficient pressure within the combustor 30 by directing some or all of the compressed air through the air bypass sections 70.

The operation of the premixing system 32 may be governed by a controller 72. The controller 72 may include control circuitry and components, such as an analog to digital convert, a microprocessor, a non volatile memory, and an interface board, among other components. The controller 72 may be designed to adjust the flow of fuel through the upstream fuel passage 58, the downstream fuel passage 60, or both based on feedback received from sensors 74 and 76. For example, the sensors 74 and 76 may include flame detectors, such as optical probes, pressure probes, dynamic pressure probes, or thermocouples, disposed within the premixing zone 54 and the combustion chamber 34. Specifically, the sensor 74 may be designed to detect flame holding within the premixing zone 54 and the sensor 76 may be designed to detect the presence of a flame within the combustion zone 34. The controller 72 also may receive feedback from a Continuous Environmental Monitoring (CEM) system 78. For example, the CEM system 78 may be designed to detect emissions of NOx within the exhaust section 24. In certain embodiments, the CEM system 78 may include sensors disposed within the upper section of the exhaust stack. The CEM system 78 may provide information on the NOx emissions to the controller 72.

The controller 72 may use the information from the CEM system 78 to detect an increase in NOx emissions, which may signify that flame holding has occurred within the premixing zone 54. In certain embodiments, the controller 72 may verify that flame holding has occurred based on feedback from the sensor 74. In response to detecting flame holding, the controller 76 may adjust the flow of fuel to one or both of the panels 50 and 52. For example, if flame holding is detected within the premixing zone 54, the controller 72 may reduce the flow of fuel through the upstream fuel passage 58 below the lean limit, thereby facilitating extinguishment of the flame. In another example, the controller 72 may cease the flow of fuel through one of the fuel passages 58 and 60. In another example, the controller 72 may switch to supplying a less reactive fuel, for example, natural gas, through the upstream fuel passage 58.

Based on feedback from the sensor 76 disposed within the combustion zone 34, the controller 76 may also detect flame holding near the downstream panel 52. In response to detecting flame holding, the controller may reduce the flow of fuel and/or vary the type of fuel flowing through the downstream fuel passage 60. In other embodiments, the input to the controller 72 may vary. For example, in certain embodiments, the controller 72 may receive input only from the CEM system 78, from the CEM system 78 and one or both sensors 74 and 76, or from one or more of the sensors 74 and 76 without feedback from the CEM system 78. Moreover, the controller 72 may regulate the flow of fuel through the fuel passages 58 and 60 by controlling one or more valves and piping configurations (not shown). Further, additional equipment, such as temperature sensors, pressure sensors, flow sensors, and/or regulators may be coupled to the controller 72.

Figure 5:
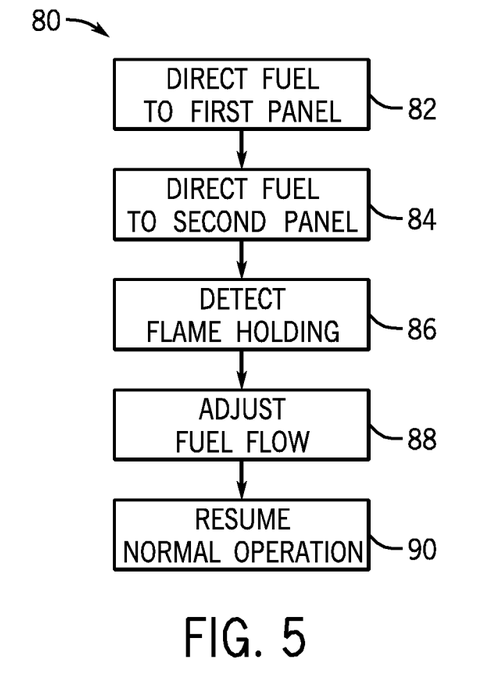
FIG. 5 is a flow chart depicting a method of operating a gas turbine engine employing a premixing system.

FIG. 5 depicts an embodiment of a method 80 for controlling the premixing system 32. The method may begin by directing (block 82) fuel to the first panel. For example, as shown in FIG. 4 the controller 72 may enable the flow of fuel through the upstream panel 50 or the downstream panel 52. In certain embodiments, if the combustor 30 is initially started up using the upstream panel 50, a sparkplug may be disposed in the premixing zone 54 to enable combustion during startup. For example, typical sparkplug or cross-fire tubes may be located in the combustion zone 34. The method 80 may then continue by directing (block 84) fuel to the second panel. For example, the controller 72 may enable the flow of fuel to the remaining panel 50 or 52. In certain embodiments, the controller 76 may direct highly reactive fuel (i.e. fuel with a high hydrogen content, such as high hydrogen syngas) to the downstream panel 52 and direct less reactive fuel (i.e. fuel with a lower hydrogen content, such as low hydrogen syngas) to the upstream panel 50 to mitigate flashback in the premixing zone 54.

Once fuel is directed to both panels, the controller 72 may vary the percentage of fuel flowing through the panels 50 and 52. For example, in certain embodiments, the controller 76 may direct approximately 25-50 percent of the fuel through the upstream panel 50 and approximately 75-50 percent of the fuel through the downstream panel 52. Moreover, in certain embodiments, the controller 76 may vary the fuel split between the panels 50 and 52 based on the reactivity of the fuel. For example, if a highly reactive fuel, such as syngas with a high hydrogen content, is employed, the controller 76 may direct approximately 25 percent of the fuel through the upstream panel 50 and approximately 75 percent of the fuel through the downstream panel 52. In another example, if a less reactive fuel, such as syngas with a low hydrogen content, is employed, the controller may direct approximately 33 percent of the fuel through the upstream panel and approximately 67 percent of the fuel through the downstream panel 52.

In response to detecting (block 86) flame holding, the controller 76 may adjust (block 88) the flow of fuel. For example, as shown in FIG. 4, the controller 76 may detect flame holding based on feedback from the CEM system 78, sensor 74 disposed in the premixing zone 54, sensor 76 disposed in the combustion zone 34, or combinations thereof. The controller 76 may then adjust the flow of fuel through the upstream fuel passage 58, the downstream fuel passage 60, or both passages 58 and 60 to abate the flame holding. For example, the controller 76 may vary the flow rate of the fuel, cease the flow of fuel, or change the type of fuel entering one or both passages 58 and 60. After the flame holding has been abated, the controller 76 may resume (block 90) normal operation. For example, the controller 76 may return the fuel flow rates or types to the previous conditions.

Figure 6:
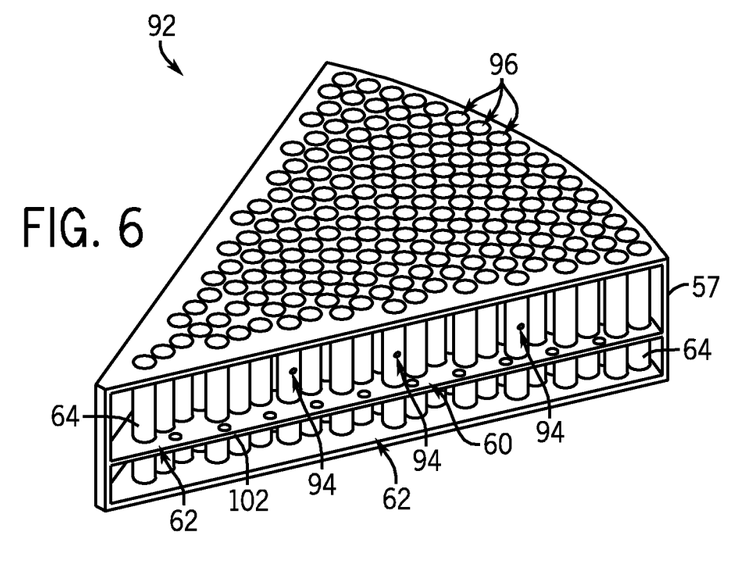
FIG. 6 is a cutaway view of an embodiment of a premixing panel that may be employed in the premixing system of FIG. 4.

FIG. 6 depicts a section of an embodiment of a PDI panel 92 that may be employed in the upstream panel 50, the downstream panel 52, or both. The PDI panel 92 includes the air tubes 64 that may direct compressed air through the panel 92. The PDI panel 92 also includes fuel plenums 62 that may receive fuel from a fuel passage 58 or 60 (FIG. 4). Within the fuel plenums 62, the fuel may flow around the air tubes 64 and may enter the air tubes 64 through openings 94 within the air tubes 64. The air and fuel may mix within the air tubes 64 and may exit the PDI panel 92 through holes 96 disposed in a downstream surface 98 of the PDI panel 92. An opposite surface 100 may combine with the downstream surface 98 to enclose the fuel plenum 62. Further, in certain embodiments, an optional flow conditioner 102, such as a perforated plate, may divide the fuel plenum 62 to reduce turbulence, control pressure drop, and/or provide a more uniform fuel flow within the fuel plenum 62. Moreover, in other embodiments, other types of PDI panels, such as PDI panels with spiraled tubes, and/or multiple fuel plenums and/or fuel passages, among others, may be employed. Furthermore, the panels may be continuous units or discrete sections brought together directly or joined via a cap from which the PDI nozzles are mounted.

Figure 7:
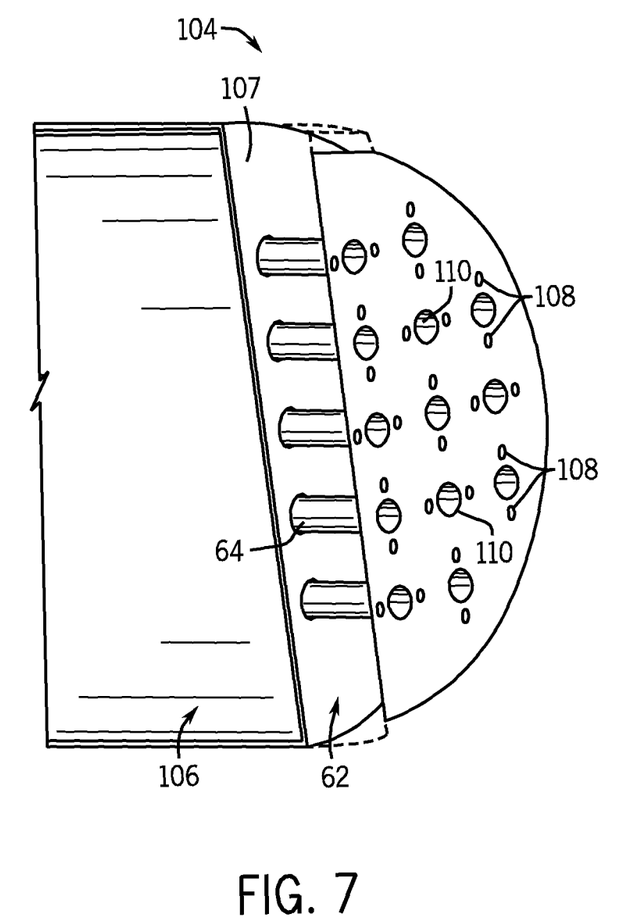
FIG. 7 is a cutaway view of another embodiment of a premixing panel that may be employed in the premixing system of FIG. 4.

FIG. 7 depicts an embodiment of an LDI panel 104 that may be employed in the upstream panel 50, the downstream panel 52, or both. The LDI panel 104 includes the air tubes 64 that may direct compressed air through the panel 104. Specifically, the LDI panel 104 includes an air plenum 106 that may receive compressed air and direct the air to the air tubes 64 through openings in a flow conditioner 107. The LDI panel 104 also includes the fuel plenum 62 that may receive fuel from a fuel passage 58 or 60 (FIG. 4). Within the fuel plenum 62, the fuel may flow around the air tubes 64. The fuel may then be directed out of the LDI panel 104 through openings 108. The openings 108 may be disposed adjacent to openings 110 dispelling air from the LDI panel 104. In certain embodiments, the openings 108 may be angled toward the air openings 110 to promote mixing between the fuel and air. Moreover, in other embodiments, other types of LDI panels, such as radial LDI panels or axial LDI panels, among others, may be employed. In certain embodiments, the use of radial and/or axial LDI panels may promote increased mixing when employed as the downstream panel 52 (FIG. 4). However, in other embodiments, any type of LDI panels may be employed for the panels 50 and 52. The panels may be continuous units or discrete sections brought together directly or joined via a cap from which the PDI nozzles are mounted.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
a combustor having a region upstream from a combustion chamber, wherein the combustor has a longitudinal axis; and
a premixing system disposed within the region of the combustor, the premixing system comprising:
an upstream mixing panel comprising a plurality of first tubes extending from a first upstream plate to a first downstream plate, at least one first fuel plenum disposed between the first upstream plate and the first downstream plate, and a plurality of first fuel openings configured to pass a fuel, wherein each first tube of the plurality of first tubes extends in a first axial direction relative to the longitudinal axis from a first inlet to a first outlet, and each first tube is configured to receive air through the first inlet;
a downstream mixing panel comprising a plurality of second tubes extending from a second upstream plate to a second downstream plate, at least one second fuel plenum disposed between the second upstream plate and the second downstream plate, and a plurality of second fuel openings, wherein each second tube of the plurality of second tubes extends in a second axial direction relative to the longitudinal axis from a second inlet to a second outlet, and each second tube is configured to receive a fuel-air mixture through the second inlet; and
a premixing zone between the upstream mixing panel and the downstream mixing panel, wherein the premixing zone is configured to direct the fuel and the air from the upstream mixing panel into the downstream mixing panel as the fuel-air mixture into the second inlet of each second tube.

2. The system of claim 1, wherein each first tube of the plurality of first tubes comprises at least one of the plurality of first fuel openings between the first inlet and the first outlet, or each second tube of the plurality of second tubes comprises at least one of the plurality of second fuel openings between the second inlet and the second outlet, or a combination thereof.

3. The system of claim 1, wherein the first downstream plate comprises at least one of the plurality of first fuel openings, or the second downstream plate comprises at least one of the plurality of second fuel openings, or a combination thereof.

4. The system of claim 1, wherein the upstream mixing panel comprises a first perforated flow conditioner plate disposed between the first upstream plate and the first downstream plate, or the downstream mixing panel comprises a second perforated flow conditioner plate disposed between the second upstream plate and the second downstream plate, or a combination thereof.

5. The system of claim 1, comprising a controller configured to adjust flow of the fuel through the upstream mixing panel, the downstream mixing panel, or both.

6. The system of claim 5, comprising one or more flame detectors disposed within the combustor, wherein the controller is configured to adjust flow of the fuel in response to feedback from the one or more flame detectors.

7. The system of claim 5, comprising a continuous emissions monitoring (CEM) system configured to measure NOx emissions levels, wherein the controller is configured to adjust flow of the fuel based on the measured NOx emissions levels.

8. The system of claim 1, wherein the combustor comprises a diffusion flame combustor.

9. The system of claim 1, comprising a turbine, a compressor, a gas turbine engine, or combinations thereof.

10. A system, comprising:
a combustor having a region located upstream from a combustion chamber, wherein the combustor has a longitudinal axis;
an upstream mixing panel mounted in the region of the combustor, wherein the upstream mixing panel comprises a plurality of first tubes extending from a first upstream plate to a first downstream plate, at least one first fuel plenum disposed between the first upstream plate and the first downstream plate, and a plurality of first fuel openings configured to pass a fuel, wherein each first tube of the plurality of first tubes extends in a first axial direction relative to the longitudinal axis from a first inlet to a first outlet, and each first tube is configured to receive air through the first inlet;
a premixing zone disposed in the region of the combustor, downstream from the upstream mixing panel, wherein the premixing zone is configured to facilitate mixing of the air and the fuel;
a downstream mixing panel mounted in the region of the combustor, downstream from the premixing zone, wherein the downstream mixing panel is configured to mix additional fuel with a fuel-air mixture from the premixing zone and output a combustion mixture to the combustion chamber.

11. The system of claim 10, wherein each first tube of the plurality of first tubes comprises at least one of the plurality of first fuel openings between the first inlet and the first outlet.

12. The system of claim 10, wherein the first downstream plate comprises at least one of the plurality of first fuel openings.

13. The system of claim 10, wherein the upstream mixing panel comprises a first perforated flow conditioner plate disposed between the first upstream plate and the first downstream plate.

14. The system of claim 10, wherein the downstream mixing panel comprises a plurality of second tubes extending from a second upstream plate to a second downstream plate, at least one second fuel plenum disposed between the second upstream plate and the second downstream plate, and a plurality of second fuel openings, wherein each second tube of the plurality of second tubes extends in a second axial direction relative to the longitudinal axis from a second inlet to a second outlet, and each second tube is configured to receive the fuel-air mixture through the second inlet.

15. The system of claim 14, wherein each first tube of the plurality of first tubes comprises at least one of the plurality of first fuel openings between the first inlet and the first outlet, and each second tube of the plurality of second tubes comprises at least one of the plurality of second fuel openings between the second inlet and the second outlet.

16. The system of claim 10, comprising a turbine, a compressor, a gas turbine engine, or combinations thereof, having the combustor with the upstream mixing panel and the downstream mixing panel.

17. A method, comprising:
directing a first flow of a fuel through an upstream mixing panel to form a fuel-air mixture, wherein the upstream mixing panel is mounted within a region of a combustor upstream from a combustion chamber, wherein the combustor has a longitudinal axis, wherein the upstream mixing panel comprises a plurality of first tubes extending from a first upstream plate to a first downstream plate, at least one first fuel plenum disposed between the first upstream plate and the first downstream plate, and a plurality of first fuel openings configured to pass a fuel, wherein each first tube of the plurality of first tubes extends in a first axial direction relative to the longitudinal axis from a first inlet to a first outlet, wherein each first tube is configured to receive air through the first inlet;
directing the fuel-air mixture through a premixing zone to a downstream mixing panel;
directing a second flow of the fuel through the downstream mixing panel to mix the second flow with the fuel-air mixture; and
adjusting the first flow, the second flow, or both in response to detecting flame holding and/or increased NOx emissions.

18. The method of claim 17, wherein adjusting the first flow, the second flow, or both comprises adjusting a flow rate, adjusting a type of the combustion fuel, or both.

19. The method of claim 17, wherein adjusting the first flow, the second flow, or both comprises switching the combustion fuel to another combustion fuel with a lower hydrogen content or lower reaction rate.

20. The method of claim 17, wherein adjusting the first flow, the second flow, or both comprises ceasing the first flow, the second flow, or both.

21. The method of claim 17, wherein each first tube of the plurality of first tubes comprises at least one of the plurality of first fuel openings between the first inlet and the first outlet.

22. The method of claim 17, wherein the downstream mixing panel comprises a plurality of second tubes extending from a second upstream plate to a second downstream plate, at least one second fuel plenum disposed between the second upstream plate and the second downstream plate, and a plurality of second fuel openings, wherein each second tube of the plurality of second tubes extends in a second axial direction relative to the longitudinal axis from a second inlet to a second outlet, and each second tube is configured to receive the fuel-air mixture through the second inlet.

* * * * *